March 31. 1925.

O. G. KREER 1,531,793

AUTOMATIC COUPLING FOR CARS

Filed Nov. 15, 1920   4 Sheets-Sheet 1

Inventor
Oscar G. Kreer,

By

Attorneys

March 31, 1925. 1,531,793
O. G. KREER
AUTOMATIC COUPLING FOR CARS
Filed Nov. 15, 1920 4 Sheets-Sheet 2

Inventor
Oscar G. Kreer,
By
Attorneys

March 31, 1925.                                              1,531,793
O. G. KREER
AUTOMATIC COUPLING FOR CARS
Filed Nov. 15, 1920          4 Sheets-Sheet 3
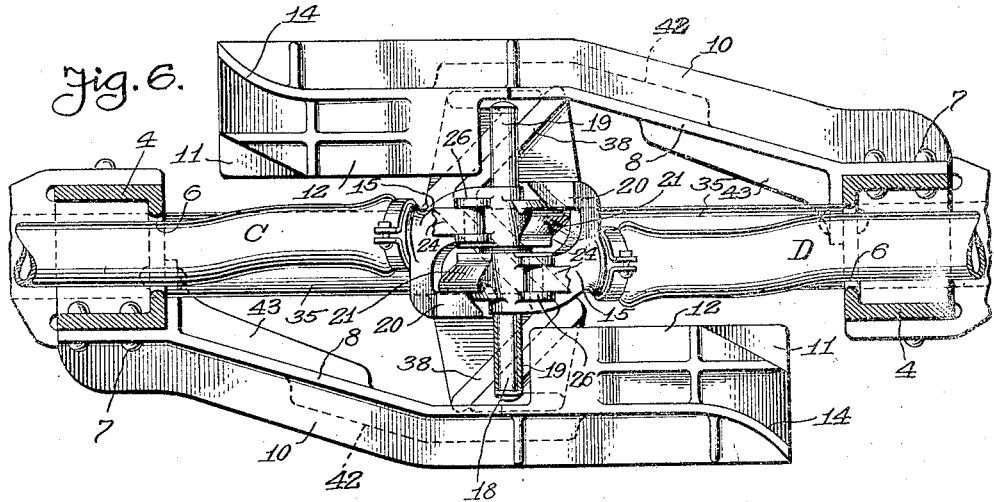
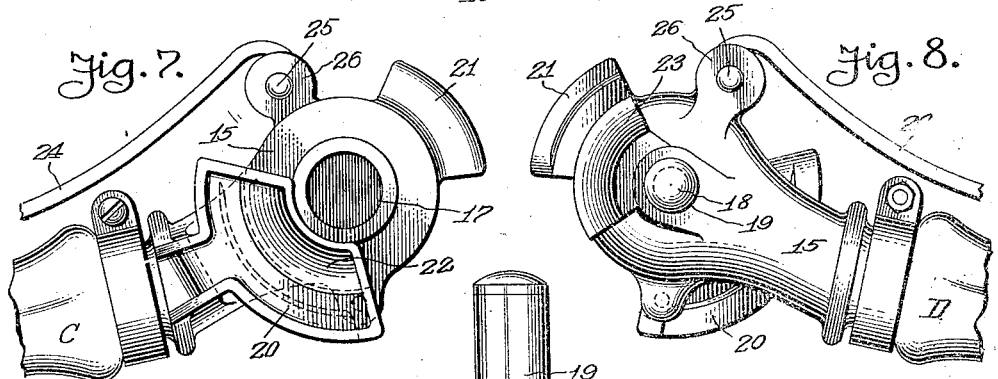
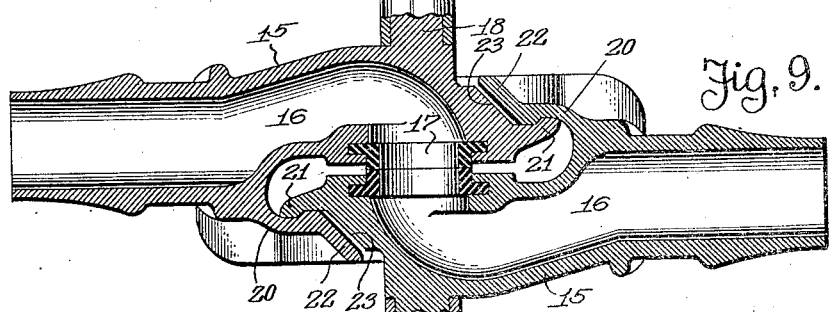
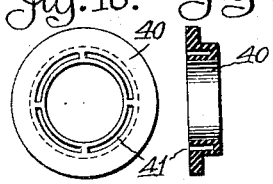
Inventor
Oscar G. Kreer,
By
Attorneys March 31, 1925.
O. G. KREER
1,531,793
AUTOMATIC COUPLING FOR CARS
Filed Nov. 15, 1920
4 Sheets-Sheet 4
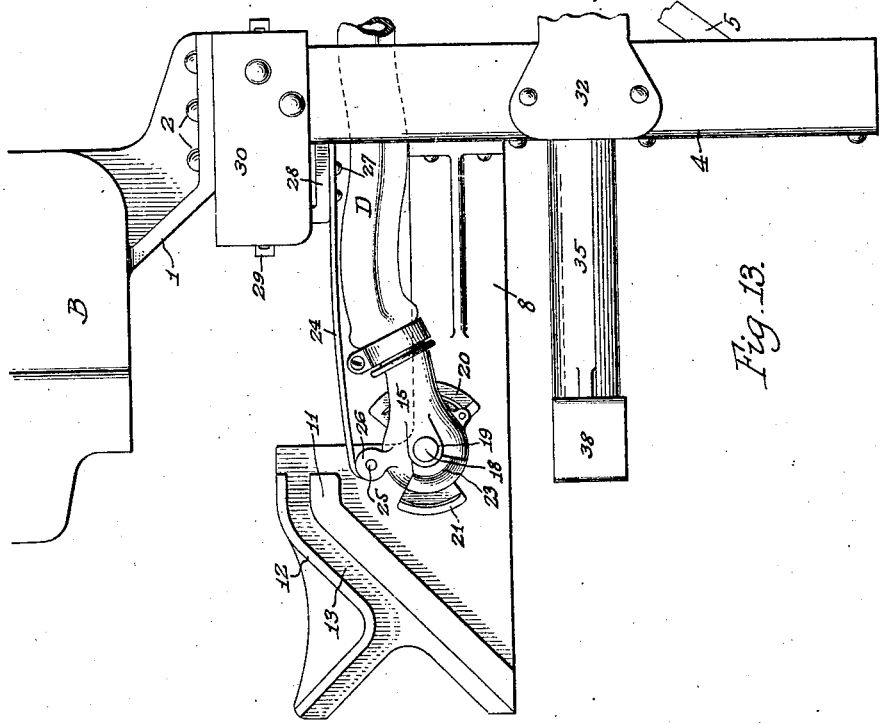
Inventor
Oscar G. Kreer, Patented Mar. 31, 1925.

1,531,793

UNITED STATES PATENT OFFICE.

OSCAR G. KREER, OF DETROIT, MICHIGAN.

AUTOMATIC COUPLING FOR CARS.

Application filed November 15, 1920. Serial No. 424,121.

*To all whom it may concern:*

Be it known that I, OSCAR G. KREER, a citizen of the United States of America, residing at Detroit, in the county of Wayne and State of Michigan, have invented certain new and useful Improvements in Automatic Couplings for Cars, of which the following is a specification, reference being had therein to the accompanying drawings.

This invention relates to an automatic coupling for cars, and has special reference to a constructive arrangement of parts by which the usual air and steam hose of rolling stock may be automatically coupled and such connections established between adjacent cars as may be necessary for proper operation of the cars.

My invention aims to eliminate that railroad hazard incident to the coupling of air hose and steam connections for maintaining the circuits of railroad trains, and I also eliminate wear and tear on heating an air line hose incurred by such hose being unprotected and ordinarily suspended at the coupled ends of the cars.

My invention further aims to provide a workable, rugged and simple apparatus for properly centering and automatically coupling train line hose, and provision is made for certain parts of the automatic coupling to yield incident to the vibrations and jars of rolling stock in operation.

My invention still further aims to provide a reliable and comparatively low priced apparatus which may be easily and quickly installed on cars already in use and even coupled to such cars not equipped with my apparatus. Consequently, it is possible to have a trunk line adopt my invention and others make use of the same until so equipped, thus avoiding a wholesale scrapping of existing facilities.

My invention will be hereinafter more fully described and then claimed, and reference will now be had to the drawings, wherein—

Fig. 6 is a plan of the hose coupling in the position shown in Fig. 3;

Figs. 7 and 8 are views in side elevation of hose couplers,

Fig. 9 is a horizontal sectional view of the couplers connected;

Figs. 10 and 11 are detail views of a modified form of gasket for coupling apparatus, and Figures 12 and 13 illustrate in side elevation the automatic hose coupling in its fully uncoupled position.

Figure 1:
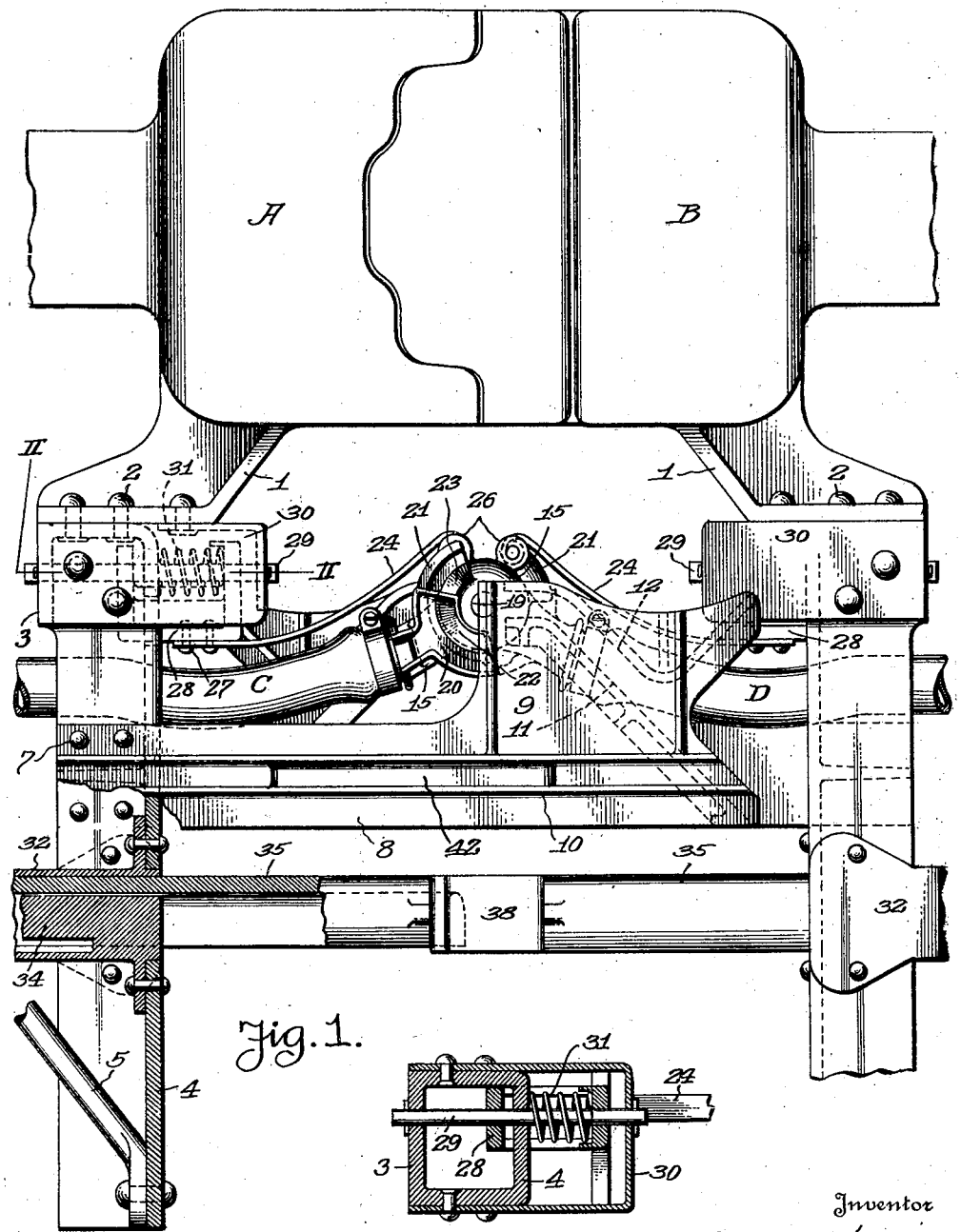
Figure 1 is a side elevation of the automatic hose coupling, partly broken away and partly in section, showing the hose couplers in an intermediate coupling position.
Figure 2:
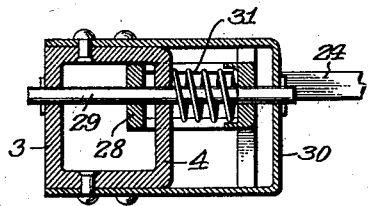
Fig. 2 is a horizontal sectional view taken on the line II—II of Fig. 1.

In the drawings, the reference characters A and B generally denote car couplers of a conventional form and these couplers support my apparatus by which steam and air line hose C and D may be automatically connected to establish operating circuits for a train. Part of the apparatus is carried by the coupler A and part by the coupler B with the parts identical in construction, with the exception that certain elements of the coupler A are the reverse of similar elements of the coupler B, so that the apparatus parts will automatically interlock and properly fit together when two adjacent cars are coupled. Since the apparatus parts are identical in construction, I deem it only necessary to describe in detail that part of the apparatus carried by the coupler A, and then generally refer to the entire apparatus in explaining its operation.

The coupler A has its lower face provided with a bracket 1 and riveted or otherwise connected thereto, as at 2, in the upper box-like portion 3 of a depending channel member 4, said channel member having its lower end connected by an angularly disposed brace 5 to some part of the coupler A or its draft rigging (not shown). The brace 5 cooperates with the bracket 1 in supporting the channel member 4 to at all times maintain its position during the operation of a car.

The channel member 4, adjacent the upper portion 3, has an opening 6 providing clearance for the hose C, and riveted or otherwise connected to the channel member 4, as at 7, is an outwardly extending guide member 8 which extends into a plane parallel with the vertical plane of the channel member 4, and said guide member has its upper edge formed with an upstanding wall 9, said wall and said guide member having faces thereof braced by suitable reinforcing webs 10, 42 and 43. The inner face of the wall 9 is provided with ribs 11 and 12 cooperating in forming an inclined groove 13 which has its upper end open adjacent the top of the guide member 8. The lower end of the groove 13 is also open intermediate the upper and lower edges of the guide member 8 and the ribs 11 and 12 are shaped or extended in diverging directions to afford a large entrance to the lower end of the groove 13. The rib 11 being carried on to the inner wall of the guide member 8, as shown by dotted lines, in Fig. 1, provides an inclined way and the wall 9, which carries the rib 12 is curved outwardly, as at 14 so as to afford a flared entrance to the groove 13. By reference to Fig. 6 it will be noted that the ribs 11 and 12 are somewhat as top and bottom walls and cooperate with the guide member 8 in providing a guide head which may be reinforced by suitable webs so as to withstand any impact incident to a coupling operation.

Suitably clamped on the end of the hose C is a coupler 15 which in a great many respects is similar to couplers now in use. It has the usual passage or channel 16 for air or steam with the passage terminating in a gasket 17 fitted in the inner face of the coupler. In lieu of the usual form of gasket I may use the gasket 40 shown in Figs. 10 and 11 which has recesses or weakened portions 41 affording greater compression of the abutting gaskets, besides facilitating mounting of the gasket in the faces of the couplers. The outer face of the coupler has an outwardly extending pin 18 which in some instances may be provided with an anti-frictional roller 19. The coupler 15 also has a segment shaped keeper 20 and a segment shaped tongue 21, said keeper and tongue having beveled or inclined portions 22 and 23, respectively. The pin 18 and the beveled portions of the keeper and tongue are improvements in connection with the usual coupler and the purpose of these improvements will hereinafter appear.

Supporting the coupler 15 is a leaf spring 24 which has its outer end provided with a barrel pivotally connected to the coupler by a pin 25 extending through said barrel and apertured lugs 26 of the coupler. The inner end of the spring 24 is riveted or otherwise connected, as at 27, to a stirrup 28 slidable on a rod 29 mounted in the box portion 3 of the channel member 4 and in an inclosure 30 carried by said channel member. Encircling the rod 29 within the stirrup 28 is a coiled expansion spring 31 which has one end thereof bearing against the box-like portion 3 of the channel member 4 and the opposite end thereof bearing against the stirrup, so that the expansive force of said spring will hold the stirrup and its spring normally extended relative to the channel member 4.

In the channel member 4, below the plane of the guide member 8, is suitably mounted a tubular guide or cylinder 32 which has its outer end open and its inner end closed by a detachable cap 33. In the outer end of the cylinder 32 is an integral core or mandrel 34, and slidable in the cylinder on the core is a plunger 35 which has its inner end reduced and surrounded by a coiled expansion spring 36. The expansive force of the spring 36 retains the plunger 35 normally in an extended position relative to the cylinder 32 and a stop or transverse pin 37 at the inner end of the plunger limits the outward movement of the plunger by impinging against the core 34.

On the outer end of the plunger 35 is a transverse saw-tooth centering head 38 affording a plurality of inclined faces for guiding or centering purposes and the faces of said centering head are well braced relative to the plunger 35 so as to withstand shocks incident to the coupling of cars.

Considering the operation of the apparatus and assuming that the couplers A and B are of the automatic type which interlock when brought into abutting relation, the centering devices below the hose C and D are first brought in action. The centering heads normally occupy positions in planes beyond the vertical transverse planes of the couplers 15 and as one car approaches the other these centering heads are found to contact in advance of the couplers 15. The inclined faces of the centering heads 38 are of sufficient area to cause the centering heads to contact even though the cars are on a curved section of track or a grade and the centering heads are flexibly brought into matched relation, as shown in Fig. 6, by the springs 36 being placed under compression. The centering device may be dispensed with under certain conditions, but I find the hose coupling heads are relieved of considerable wear, swaying action eliminated, and better results obtained. Furthermore, the centering heads may contact in advance of the coupling heads and thereby better position or aline the heads for coupling purposes.

While this centering operation has been taking place, the pins 18 enter the wide and flared entrances of the heads on the guide members 8 as these guide members are brought into opposed relation with the couplers 15 therebetween. The pins 18 enter the grooves 13 and are forced upwardly in said grooves causing the springs or flexible members 24 to be flexed or bent upwardly, as shown in Fig. 1. This flexing of the springs 24 is not sufficient however, to push the stirrups 28 outwardly as the springs 31 resist such movement, although the springs may be brought into action to permit of the stirrups yielding should there be a sudden coupling of the cars.

Figures 3, 4, 5:
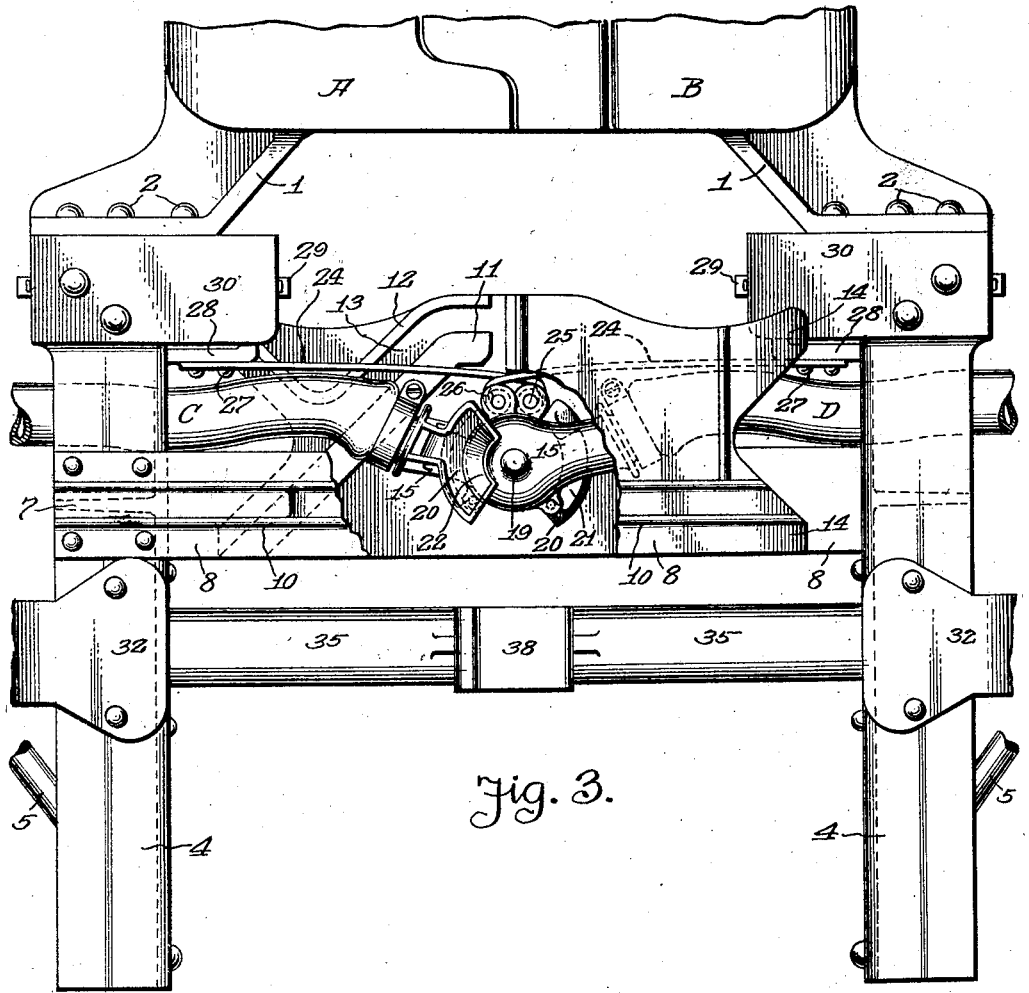
Fig. 3 is a view similar to Fig. 1, partly broken away, showing the hose couplers as coupled.
Fig. 4 is a longitudinal sectional view of a primary centering device forming part of the apparatus.
Fig. 5 is a cross sectional view taken on the line V—V of Fig. 4.

As the pins 18 travel upwardly in the groove 13 the couplers 15 are brought into matched relation, that is, with the tongues 21 above the keepers 20 in position to ride into the keepers when a turning action is imparted to the couplers 15. Here again, the beveled faces of the keepers and tongues assists in properly centering the couplers 15, and eventually the matched couplers reach the position shown in Fig. 1 where the pins 18 ride out of the open ends of the grooves 13 and are liberated under the influence of the springs or flexible members 24. These springs or flexible members cause the couplers to turn, the pins 25 moving towards each other so that the joint may break down, somewhat similar to a rule joint, and in so doing straighten out, as shown in Fig. 3, with the tongue 21 entering the keepers 20 and the beveled faces of said tongues and keepers causing the couplers to more firmly interlock. When the couplers turn the tension on the springs 24 is gradually decreased and it is the inherent tendency of these flexed springs to straighten that causes the couplers to turn and in so doing become interlocked. It is in this interlocked position that the couplers are maintained during the operation of the train and while the hose C and D permit of a certain degree of flexibility, the inner ends of the springs or flexible members 24 may yield during any sudden jarring of the coupled car.

When two cars are uncoupled, the couplers will again be turned, this time the pins 25 moving away from each other. It will be noted during the uncoupling operation that the initial separating movement of the cars causes the hose C and D to straighten out, and it is during this initial movement that the springs 24 pull the pins 25 and 26 towards each other, that is, into transverse alinement. The resultant rotation of the couplings by reason of this action of the springs 24 effects the unlocking of the segments, and upon the further continuance of the uncoupling operation the pins 18 are engaged by the undersides of the ribs 11 of the opposite coupling members whereupon they ride downwardly beneath the said ribs and against the resistance of the said springs 24 until the said pins pass the extremities of said ribs. The springs 24 then return to their normal position, lifting the couplings again to the position indicated in Figures 12 and 13 in which position they are again ready to travel upwardly in the inclined grooves of the opposite coupling members 13 in the next coupling operation.

It is thought that the operation and utility of the automatic coupling will be apparent without further description and while in the drawings there are illustrated embodiments of my invention it is to be understood that the structural elements are susceptible to such variations and modifications as fall within the scope of the appended claims.

What I claim is:—

1. In a car coupling apparatus, depending members, guide members carried thereby and adapted to be shifted past each other in parallel planes, hose couplers, springs supporting said hose couplers and being flexed to that extent when the couplers come together to cause said couplers to assume an active interlocked position, and means carried by said hose couplers adapted to enter said guide members and guide said hose couplers into coupling relation.

2. An apparatus as in claim 1, characterized by additional means, below said couplers, guiding said couplers together.

3. The combination with car coupling means, and hose couplers below said means, of pins extending outwardly from said hose couplers, grooved guides below said car coupling means to receive said pins and guide said hose couplers into coupling relation and yieldable means supporting said hose couplers to cause said hose couplers to interlock after assuming a coupling relation.

4. The combination set forth in claim 3, wherein additional means below said hose couplers assists in guiding said hose couplers into longitudinal alinement for coupling purposes.

5. The combination set forth in claim 3, wherein said yieldable means includes springs which may be flexed in vertical planes and yield in lateral planes.

6. The combination with cars adapted to be coupled together and a hose coupler carried by each car, of a yieldable spring carried by one of the cars and supporting the hose coupler thereof, said spring being flexible in a vertical plane, and yieldable in a lateral plane, and means carried by the other car for guiding said spring supported hose coupler into operative relation with the other hose coupler and causing said spring to interlock the hose couplers.

7. The combination of hose couplers, springs supporting said hose couplers, pins carried by said hose couplers, and guide members to receive said pins and having a configuration to cause said pins to ride upwardly therein and place said springs under tension and said hose couplers in coupling relation, said guide members releasing said pins so that said springs may cause said hose couplers to interlock, said guide members causing said pins to be lowered when said hose couplers are separated so that said pins may clear said guide members.

In testimony whereof I affix my signature in presence of two witnesses.

OSCAR G. KREER.

Witnesses:
  ANNA M. DORR,
  KARL H. BUTLER.